United States Patent [19]

F'Geppert

[11] 4,165,081
[45] Aug. 21, 1979

[54] CONSTANT FORCE FACE SEAL

[75] Inventor: Erwin F'Geppert, Novi, Mich.

[73] Assignee: The United States of America as represented by the Secretary of the Army, Washington, D.C.

[21] Appl. No.: 896,128

[22] Filed: Apr. 14, 1978

[51] Int. Cl.² .............................................. F16J 15/34
[52] U.S. Cl. ................................................... 277/88
[58] Field of Search ............................. 277/81, 88, 89

[56] References Cited

U.S. PATENT DOCUMENTS

| 3,480,285 | 11/1969 | Anderson | 277/88 |
| 3,621,443 | 11/1971 | Sewell | 277/88 |
| 3,827,702 | 8/1974 | Winiarz | 277/88 |
| 3,856,077 | 12/1974 | Siegla | 277/88 |
| 3,887,200 | 6/1975 | Engelking et al. | 277/88 |

Primary Examiner—Robert I. Smith
Attorney, Agent, or Firm—Peter A. Taucher; John E. McRae; Nathan Edelberg

[57] ABSTRACT

A face seal for sealing the joint between a rotary shaft and a stationary housing, said seal comprising two sealing discs engaged together through the biasing force of a zero rate spring means. The spring means provides a constant biasing force to maintain a pre-determined sealing engagement force between the discs irrespective of such disturbances as manufacturing tolerances, component assembly errors, service oscillations of the shaft, vibrational effects, or service wear on the sealing discs.

6 Claims, 3 Drawing Figures

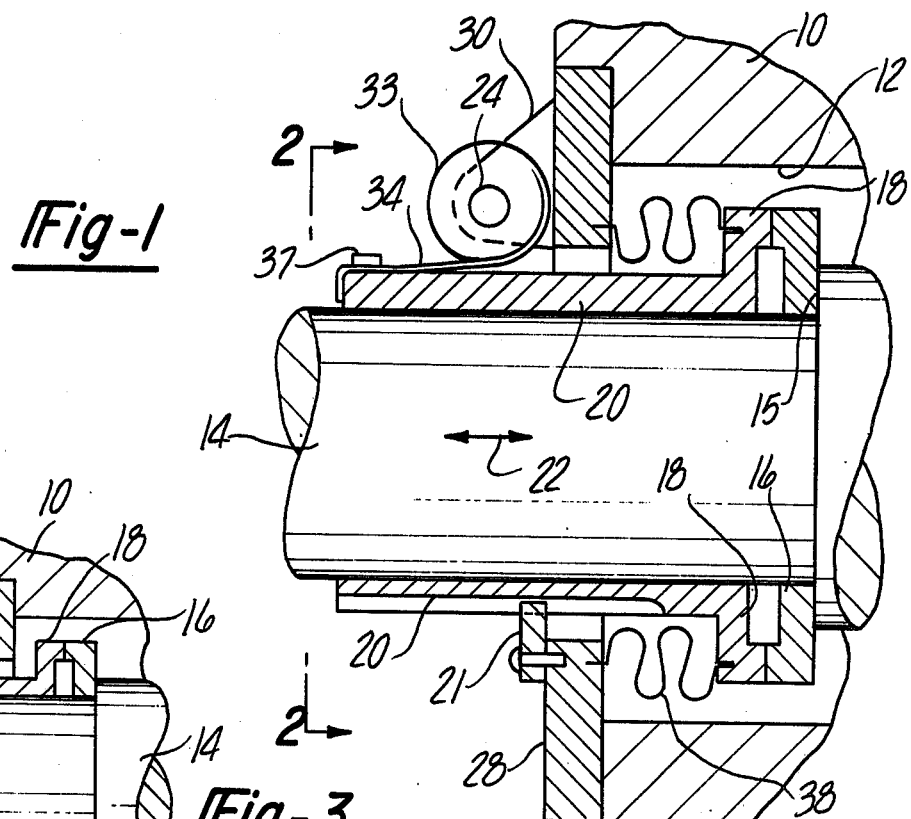
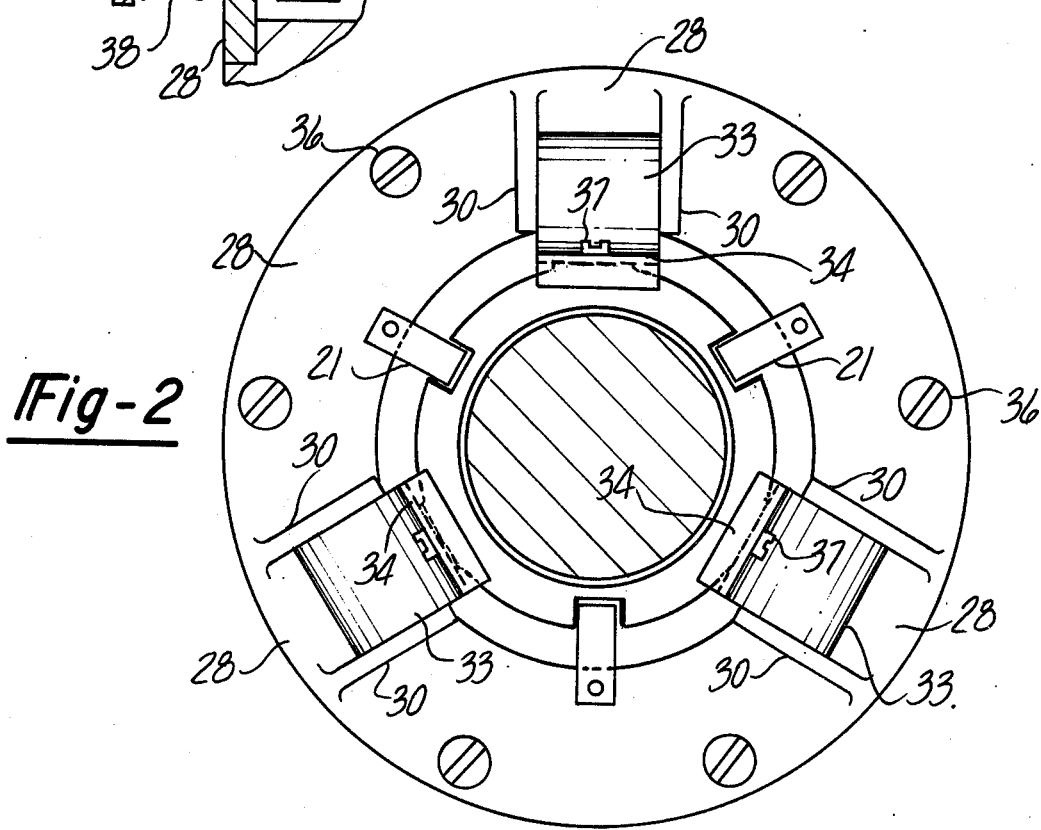

CONSTANT FORCE FACE SEAL

BACKGROUND AND SUMMARY OF THE INVENTION

U.S. Pat. No. 2,525,365 issued to W. W. Meyer on Oct. 10, 1950 shows and describes a face seal for sealing the joint between a stationary housing and a rotary shaft. The present invention is directed to a seal of this general type. The principle object of this invention is to provide a face seal that includes a zero rate spring means as the biasing device for maintaining pressure engagement between the sealed faces. This type of spring means is advantageous in that it provides a constant biasing force on the associated sealing disc. Therefore, initial performance is not critically dependent on exact positionment of one disc relative to the other; the constant force spring automatically takes up any lost space that would otherwise occur by reason of improperly located discs. This type of spring means also is advantageous in that it maintains a given biasing force over the entire service life of the seal irrespective of wear that would otherwise change the positions of the sealing disc and thus decrease the effective spring force; with my proposed arrangement the spring force remains constant so that the sealing discs do not have to be overpressurized initially to compensate for loss of spring pressure due to wear.

The invention described herein may be manufactured, used, and licensed by or for the Government for governmental purposes without payment to me of any royalty thereon.

THE DRAWINGS

FIG. 1 is a sectional view taken through a seal construction embodying my invention.

FIG. 2 is a view taken on line 2—2 in FIG. 1.

FIG. 3 is a view similar to FIG. 1 but illustrating another embodiment of my invention.

FIG. 1 fragmentarily illustrates a stationary housing 10 having a circular opening 12 for accommodating a circular rotary shaft 14, said shaft extending through said opening so that one section of the shaft is located within the housing and another section of the shaft is located outside the housing. The joint between the shaft 14 and the opening 12 is sealed by means of two annular sealing discs 16 and 18; said disc 16 being affixed to shaft 14, as by a press fit thereon, and said disc 18 being carried on an annular sleeve 20 that is slightly oversize relative to shaft 14. Sleeve 20 is slidably oriented on the shaft for axial movement therealong as denoted by arrows 22 in FIG. 1; tendency of the sleeve to turn on shaft 14 is precluded by guide elements 21 projecting from stationary plate 28 into grooves formed on the sleeve. The engaged faces on discs 16 and 18 are smooth flat sealing faces that extend radially relative to the axis of shaft 14 so that when the discs are pressurized or biased against one another the sealing faces mate together to prevent fluid flow thereacross.

The mechanism for biasing the sealing disc 18 against disc 16 comprises three zero rate spring mechanisms, each being a commercially available spring device marketed by Hunter Spring Division of Ametek Inc. under the trade name "Negator". Each such spring device comprises a spool or drum 24 rotatably mounted between and on two ears 30 projecting leftwardly from a mounting plate 28, said mounting plate being affixed to housing 10 by means of screws 36 (see FIG. 2). Tightly encircling each spool 24 is a length of spring strip stock, the strip being pre-stressed toward a coiled condition of minimum radius of curvature to define a multi-convolution coil 33. The strip commonly would include a number of strip convolutions tightly wound on the spool and on each other toward a wound-up condition. The strip is partially unwound from its coil to provide an exposed end 34 that is anchored to the left end of sleeve 20 by means of a screw 37. Due to its pre-stressed tendency to wind up on the coil the exposed end portion 34 of the strip tends to move rightwardly parallel to the axis of shaft 14. The pre-stressed force is substantially independent of the unwound length 34 of the spring strip. Therefore, the rightward biasing force on sleeve 20 is substantially independent of the sleeve position on shaft 14. Thus, the spring force is a constant irrespective of such manufacturing tolerances or variations as the length of sleeve 20, the axial thickness of disc 16 or disc 18, the exact location of the mounting shoulder 15 on the shaft, or the exact location of spring device 33 relative to the joint defined by discs 16 and 18. This explains the principle advantage of this mechanism, namely the capability for providing a precise engagement force between the sealing faces on discs 16 and 18 irrespective of whatever manufacturing or assembling inconsistencies may be present at any given manufacturing facility.

With the illustrated arrangement it is necessary to provide a second seal between sleeve 20 and mounting plate 28. This seal may be provided by a conventional metallic bellows 38 having its ends trained between plate 28 and disc 18. Preferably the effective diameter of the bellows is approximately the same as the effective diameter of the annular sealing joint between discs 16 and 18, the purpose in this relationship being to minimize the effect of fluid under pressure within housing 10. The bellows maintains a balanced condition whereby high pressures prevailing within housing 10 have no tendency to seat or unseat disc 18 relative to disc 16; therefore the sole biasing mechanism in the system is the spring device 33. This device is manufactured or pre-selected to maintain an axial spring force on sleeve 20 and disc 18 sufficient for sealing purposes, but not so high as would promote abnormal or premature wear of the disc sealing surfaces.

FIG. 3 illustrates a variation of the invention wherein the bellows 38 is trained between plate 28 and a flange 40 carried by sleeve 20. The FIG. 3 device is otherwise similar to the device shown in FIGS. 1 and 2. Functionally both devices operate in the same manner.

I wish it to be understood that I do not desire to be limited to the exact details of construction shown and described for obvious modifications will occur to a person skilled in the art.

I claim:

1. In combination: a housing having an opening therein; a rotary shaft extending through said opening so that one section of the shaft is located within the housing and another section of the shaft is located outside the housing; means for sealing the annular clearance between the shaft and the housing; said sealing means including a first annular sealing disc carried by the shaft and having a smooth flat seal face extending radially relative to the shaft axis, a sleeve slidably encircling the shaft for axial movement therealong, and a second annular sealing disc carried by the sleeve, said second disc having a smooth flat seal face extending radially relative to the shaft axis in juxtaposition to the seal face on the first disc whereby fluid is prevented from passing across the annular joint defined by the seal faces; and zero rate spring means trained between the housing and sleeve for urging the sleeve in the direction that will press the second sealing disc against the first sealing disc; said spring means comprising at least one rotary spool and a strip of spring stock coiled thereon, each spring strip being pre-stressed toward a condition of minimum radius of curvature so that the strip tightly encircles the spool; the spool being rotatably attached to one of said housing and sleeve, and the exposed end of the spring strip being anchored to the other of said housing and sleeve.

2. The combination of claim 1 and further comprising a metallic bellows trained between the second annular disc and the housing to prevent fluid flow through the clearance space between the sleeve and housing surface defined by the aforementioned opening.

3. The combination of claim 1 and further comprising a metallic bellows trained between the sleeve and the housing to prevent fluid flow through the clearance space between the sleeve and housing surface defined by the aforementioned opening.

4. The combination of claim 1 wherein each rotary spool is located on an axis tangent to a circumferential line drawn around the shaft axis.

5. The combination of claim 4 wherein said spring means comprises three rotary spools, each having a strip of spring stock coiled thereon; said spools being located outside the aforementioned sleeve equidistant from each other.

6. The combination of claim 1 wherein each rotary spool is carried on the housing at a location spaced radially outwardly from the sleeve, the exposed end of the associated spring strip extending along the outer surface of the sleeve to an anchorage near the sleeve end remote from the second sealing disc.

* * * * *